Figure 1:
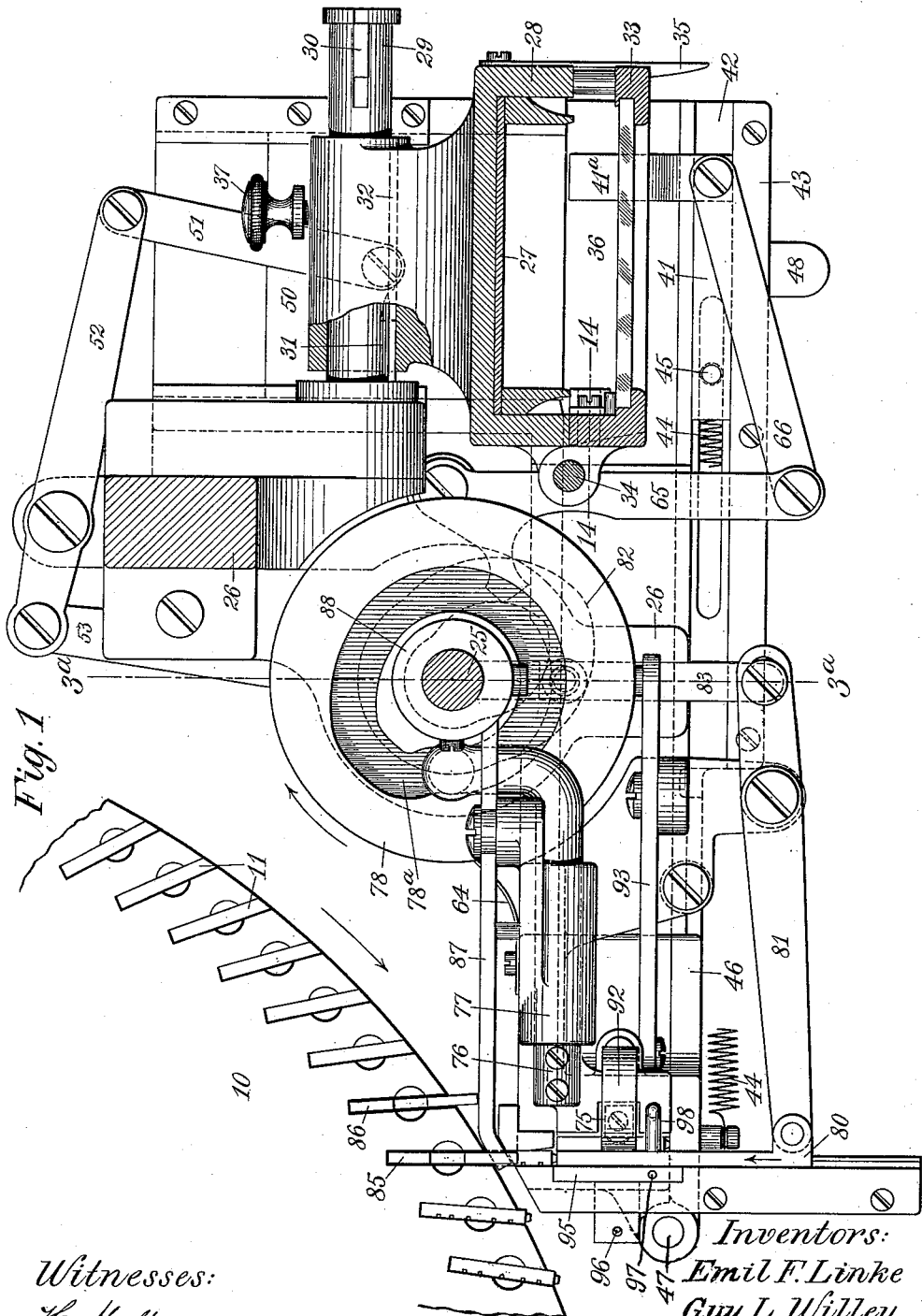

No. 614,662. Patented Nov. 22, 1898.
E. F. LINKE & G. L. WILLEY.
TYPE SEPARATING MACHINE.
(Application filed Sept. 4, 1897.)

(No Model.) 6 Sheets—Sheet 1.

Witnesses:
H. Mallner
F. A. Clemons

Inventors:
Emil F. Linke
Guy L. Willey
By their Attorney
W. H. Honiss

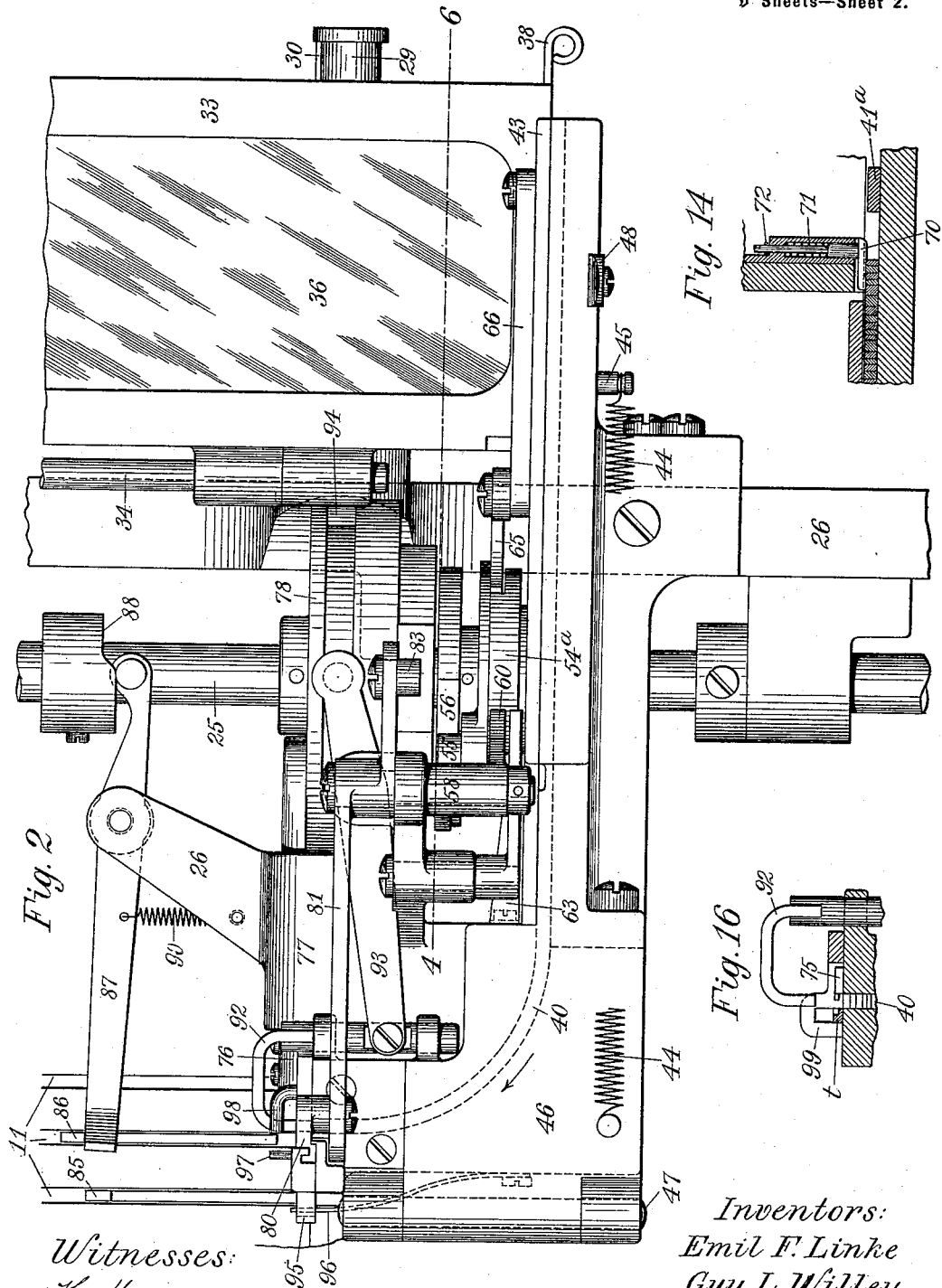

No. 614,662. Patented Nov. 22, 1898.
E. F. LINKE & G. L. WILLEY.
TYPE SEPARATING MACHINE.
(Application filed Sept. 4, 1897.)
(No Model.)
6 Sheets—Sheet 3.
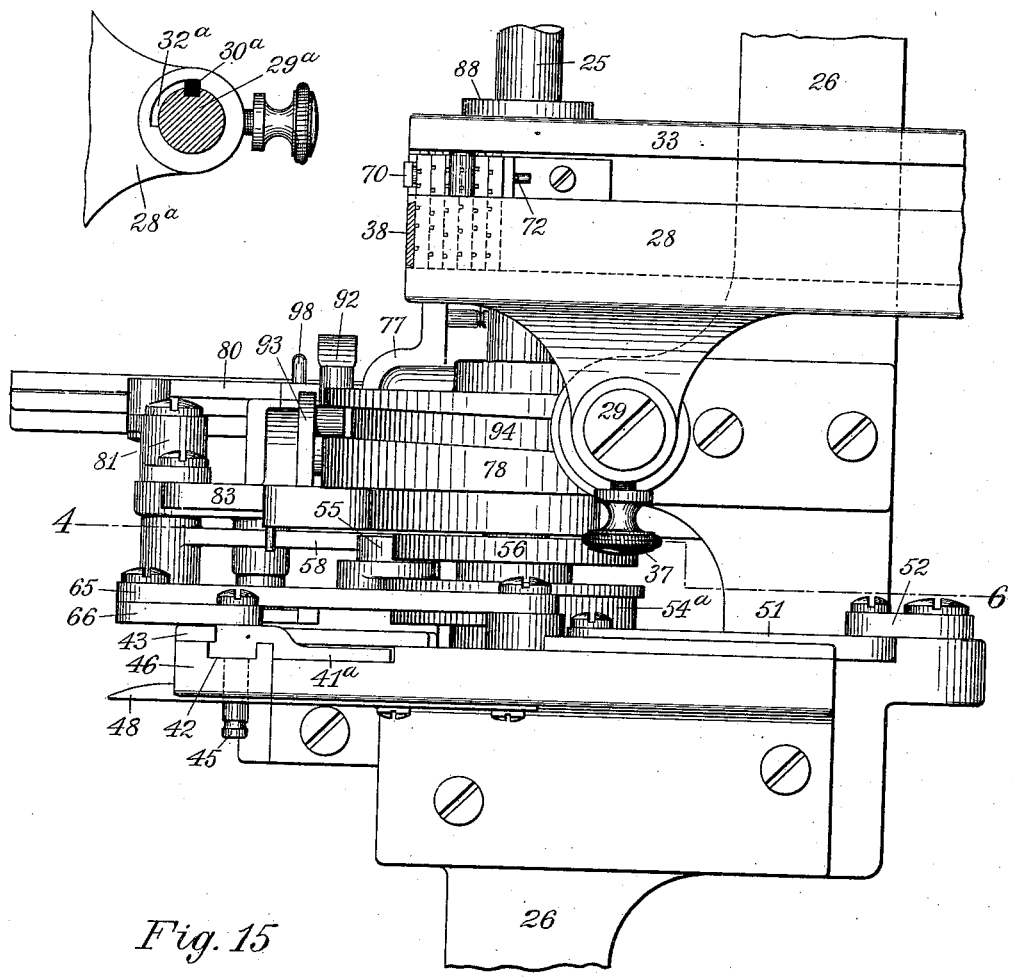
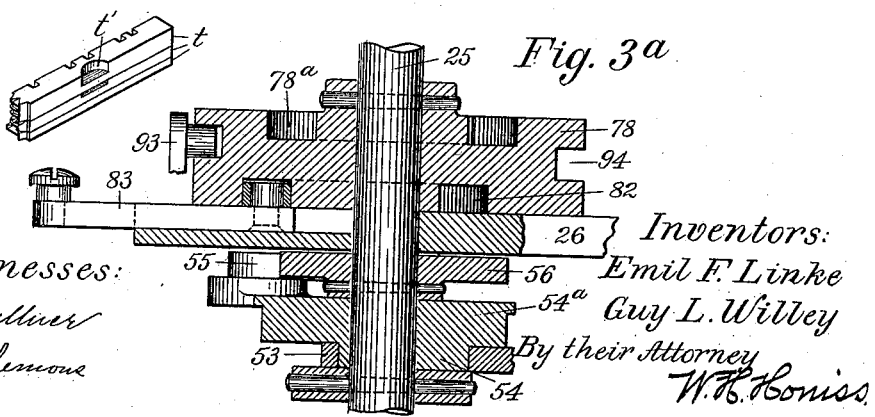
Witnesses:
H. Mallner
J. A. Clemons
Inventors:
Emil F. Linke
Guy L. Willey
By their Attorney
W. H. Honiss No. 614,662. Patented Nov. 22, 1898.
E. F. LINKE & G. L. WILLEY.
TYPE SEPARATING MACHINE.
(Application filed Sept. 4, 1897.)
(No Model.) 6 Sheets—Sheet 4.
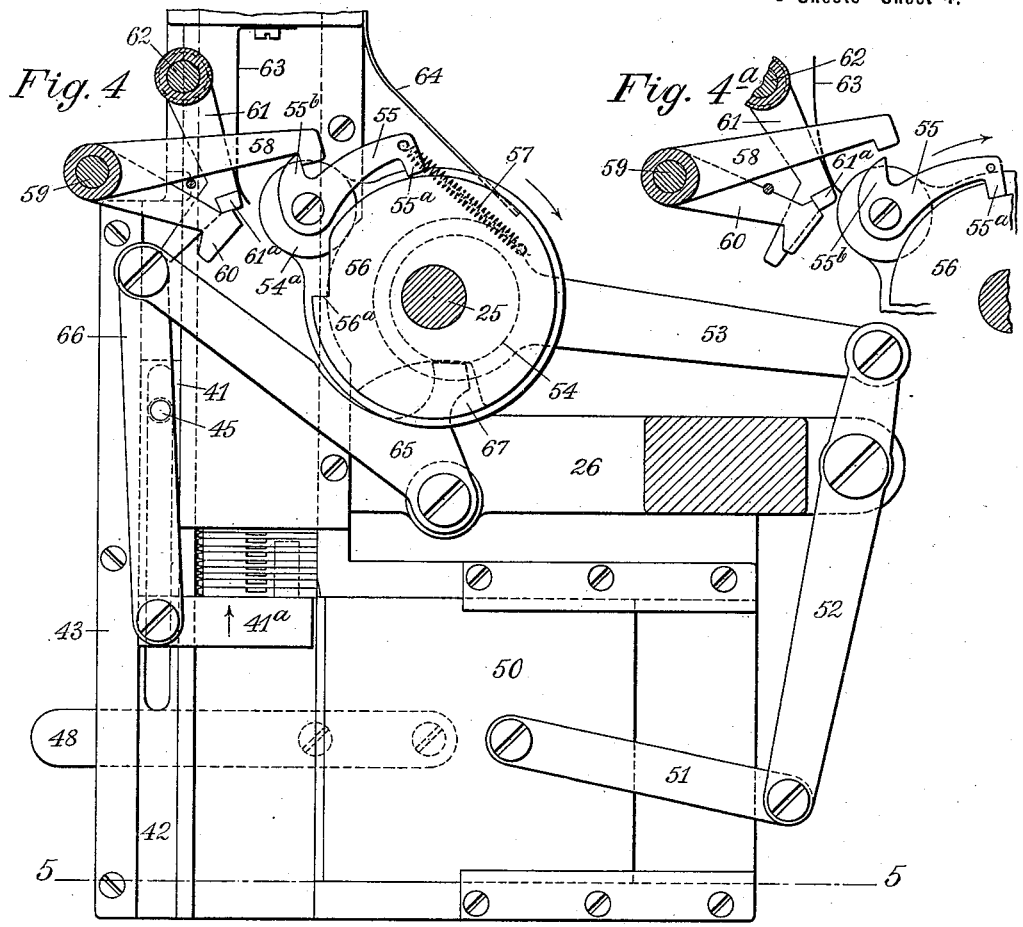
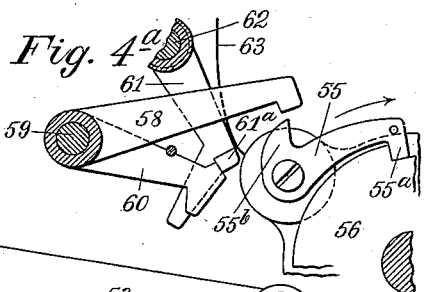
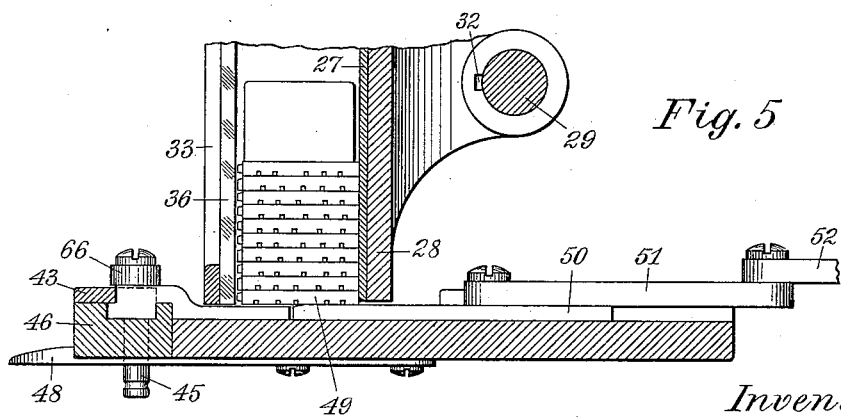
Witnesses:
H. Mallner
F. A. Clemons
Inventors:
Emil F. Linke
Guy L. Willey
By their Attorney
W. H. Honiss No. 614,662. Patented Nov. 22, 1898.
E. F. LINKE & G. L. WILLEY.
TYPE SEPARATING MACHINE.
(Application filed Sept. 4, 1897.)

(No Model.) 6 Sheets—Sheet 5.

Witnesses:
H. Mallner
J. A. Clemons

Inventors:
Emil F. Linke
Guy L. Willey
By their Attorney
W. H. Honiss

No. 614,662. Patented Nov. 22, 1898.
E. F. LINKE & G. L. WILLEY.
TYPE SEPARATING MACHINE.
(Application filed Sept. 4, 1897.)
(No Model.) 6 Sheets—Sheet 6.
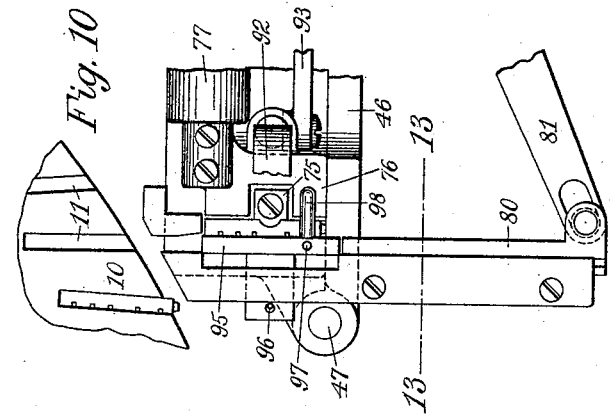
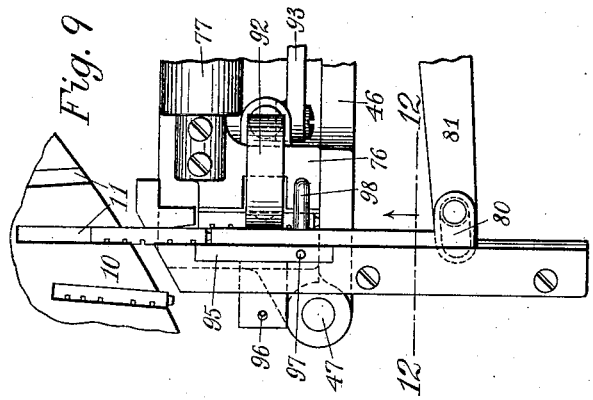
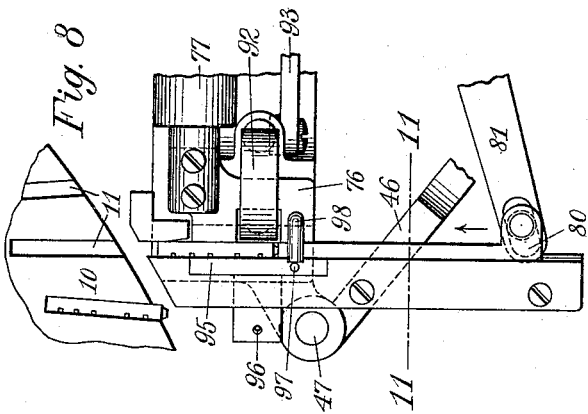
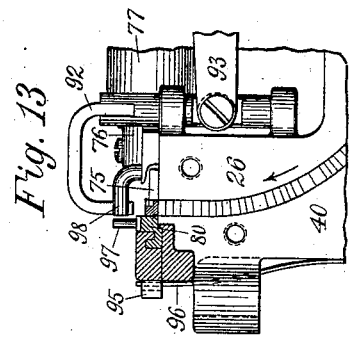
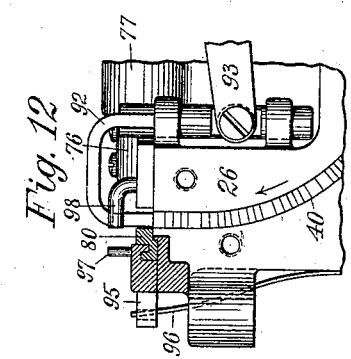
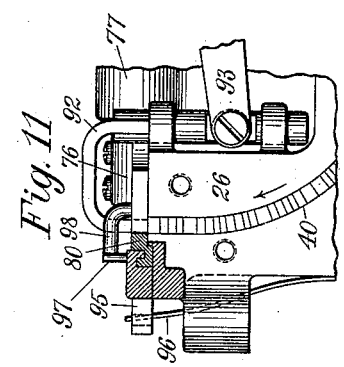
Witnesses:
H. Mallner
F. A. Clemons
Inventors:
Emil F. Linke
Guy L. Willey
By their Attorney
W. H. Honiss.

UNITED STATES PATENT OFFICE.

EMIL F. LINKE AND GUY L. WILLEY, OF HARTFORD, CONNECTICUT, ASSIGNORS TO THE THORNE TYPESETTING MACHINE COMPANY, OF NEW JERSEY.

TYPE-SEPARATING MACHINE.

SPECIFICATION forming part of Letters Patent No. 614,662, dated November 22, 1898.

Application filed September 4, 1897. Serial No. 650,686. (No model.)

*To all whom it may concern:*

Be it known that we, EMIL F. LINKE and GUY L. WILLEY, citizens of the United States, residing at Hartford, in the county of Hartford and State of Connecticut, have invented certain new and useful Improvements in Type-Separating Machines, of which the following is a full, clear, and exact specification.

This invention relates to machinery for effecting the distribution of type from a line or from a column into channels in which the type is stored in sorts ready for subsequent use.

The object of the invention is to provide improved and reliable means for automatically detaching the succeeding lines of type from a galley by pushing them therefrom into a feed-channel, along which they are pushed into engagement with the type-separating devices, which, as a further object of this invention, are adapted to separate the individual pieces of type from the advancing line in the channel and transfer them singly to the distributing devices. The utility of thus separating each piece of type arises from the circumstance that the type is liable to become matted together by the pressure it undergoes when "locked up" in a chase or form and unless thus positively separated will not distribute properly.

The invention is herein shown as being employed in connection with devices for subsequently distributing the separated type into their respective channels in a type-setting machine of the class shown and described in the United States Patent to J. Thorne, No. 372,187, of October 25, 1887. Those channels are cut in the periphery of a stationary composing-cylinder, above which is mounted a distributing-cylinder having similarly-arranged channels, into which the separated type are injected singly by some of the devices of my present invention. An intermittent rotary movement is imparted to the upper or distributing cylinder by means not herein shown and which form no part of the present invention, thereby presenting the separated type contained in its channels successively to the channels of the lower or fixed cylinder, which, being provided with wards arranged in well-known ways in accordance with a system of nicks in the edges of the type, admit the type only to their respective sort-channels.

Figure 6:
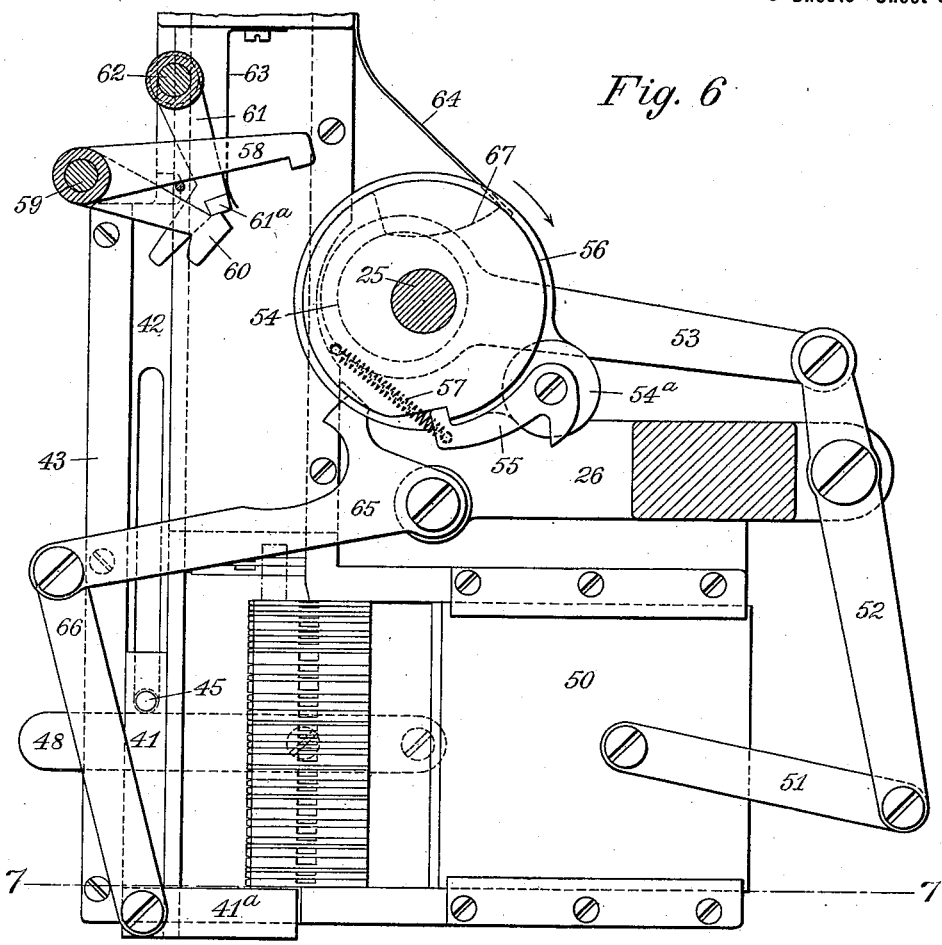
Figure 7:
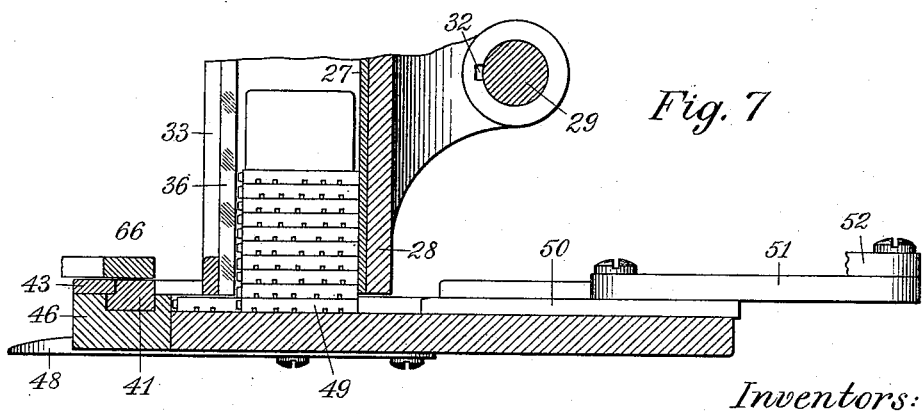

Figure 1 of the drawings is a plan view of our improved apparatus, showing in connection therewith a fragment of the rotating distributing-cylinder to which the type are fed, the remainder of the machine being omitted and the framing and other connections with that machine being broken away so as to show our improved apparatus more clearly. Fig. 2 is a front view projected from Fig. 1, showing in connection therewith lines representing three of the type-channels of the cylinder in order to illustrate the operation of our devices for lifting the channel-weights or followers to allow of the ejection of the separated type. Fig. 3 is an end view projected from the right hand of Figs. 1 and 2, differing therefrom only in the respect that the type-galley, which in Figs. 1 and 2 is shown to be in a vertical position, is in Fig. 3 represented as being turned back through an angle of ninety degrees, so as to rest in its horizontal position. Fig. $3^a$ is an end elevation in section taken on the line $3^a$ $3^a$ of Fig. 1, showing the details of the cams and other driving devices. Fig. 4 is a plan view in section taken on the line 4 6 of Figs. 2 and 3, showing our line-pushing and line-cut-off mechanisms in the position occupied by them just prior to the detaching or cutting off of a new line from the bottom of the galley. Fig. $4^a$ is a fragmentary view showing the devices for releasing the line-cut-off mechanism in a position immediately following that in which they are shown in Fig. 4. Fig. 5 is an end view in section taken on the line 5 5 of Fig. 4, showing the parts in the position occupied by them in the latter figure and showing in addition thereto the lower portion of the galley with several lines of type contained therein. Fig. 6 is a plan view, also in section, taken on the line 5 6 of Figs. 2 and 3. This view differs from Fig. 4 only in the respect that the parts thereof are shown in the position occupied by them when the eccentric 54 of the line-cut-off mechanism has made a half-revolution from its position shown in Fig. 4. Fig. 7 is an end view in section taken on the line 7 7 of Fig. 6, showing the line-cut-off slide retracted so as to allow the lower line of the type in the galley to drop down in front of that slide. Figs. 8, 9, and 10 are plan views; and Figs 11, 12, and 13 are front end views projected, respectively, from Figs. 8, 9, and 10, showing in three different positions those portions of our improved type-separating device which engage directly with and separate each succeeding piece of type from the line and which inject them into the succeeding channels of the distributing-cylinder. Figs. 8 and 11 represent the devices in the act of pushing a separated piece of type toward the cylinder. Figs. 9 and 12 represent the same devices after they have pushed the piece of type part way into the cylinder; and Figs. 10 and 13 represent the devices upon their return to a position which permits of the line being advanced a sufficient extent to allow the uppermost piece of type to be separated therefrom, that uppermost type being shown in section in Fig. 13 in order to enable the engagement therewith of the stop-finger to be better seen. Fig. 14 represents a vertical section taken on the line 14 14 of Fig. 1, showing more clearly the detailed construction and arrangement of our improved presser-foot for retaining the type in position and preventing them from falling over while the line-pusher is drawn back to bring forward a new line. Fig. 15 is a perspective view of three pieces of type of differing thickness, showing the manner in which they are nicked to enable them to be separated by the improved devices of this invention. Fig. 16 is a fragmentary front view showing a modified construction of our improved separator, whereby the employment of the spring-buffer shown in the previous figures may under some circumstances be dispensed with. Fig. 17 shows a modified arrangement of our means for holding the galley-receiver in its different positions.

The embodiment of our invention herein shown is adapted to be used in connection with or as auxiliary to a type-distributing machine of the class shown in the aforesaid United States patent, No. 372,187, of October 25, 1887, to J. Thorne, the mechanism of this device being supported on a frame 26, which is attached to or integral with the general framework of the principal machine, the motive power being also derived from that of the principal machine through the medium of the shaft 25.

The fonts of type $t$, in connection with which this device is to be employed, are nicked, as shown in Fig. 15, in accordance with a system in which the thinnest piece of type to be used is taken as a standard of thickness, all of the other pieces of type in the font being reduced at a portion $t'$ thereof, substantially midway of their length, to a thickness somewhat less than twice that of the thinnest type in the font. The reduction or nicking is made upon the leading side of the type as it advances through our machine, the reduced portion being pushed into engagement with a stop-finger which permits each succeeding piece of type, whatever its actual body size, to project beyond its guiding-channel sufficiently far to enable that projecting piece and no more to be separated from the line of type in the channel by being pushed aside, as will be hereinafter more fully explained.

The column of type to be distributed is contained in the removable galley 27, which is inserted in the galley-receiver 28, a weight W being preferably employed to assist in moving the column downwardly. The receiver is loosely mounted upon the stud 29, fixed in a portion of the framework 26. That stud is provided with the spline 30 at its outer end and with the spline 31 at its inner end, these splines being separated by an angular distance equal to that to which the galley is to be turned back from its vertical position. The receiver 28 is provided with the single splineway 32, which when engaging with the spline 31 holds the receiver, and consequently the type-galley, in the vertical position shown in Figs. 1, 2, 5, and 7, and when engaging with the spline 30 sustains the receiver and the type in an inclined or horizontal position relative to the machine, as shown in Fig. 3, being moved to this latter position for greater convenience in inserting and removing the galley. The distance between the splines 30 and 31 longitudinally of the stud 29 is sufficient to allow the receiver 28 to turn between them, and, in fact, their ends form stops against which the receiver is drawn longitudinally before turning to its next desired position. In Fig. 1 the receiver is shown to be moved slightly toward the right from the position it should occupy when delivering lines of type to the feed-channel, being thus placed in order to show the relation of the parts more clearly. It will, however, be seen that upon moving the receiver toward the left from the position shown in Fig. 1 against the shoulder of its stud the sides of the galley 27 will be brought into alinement with the sides of the cut-off slide 50, in which position it is secured by means of the set-screw 37. The galley-holder is also provided with a door or lid 33, hinged at 34 and provided with a latch 35, the door preferably having a glass front 36 in order to enable the downward progress of the column of type to be observed by the attendant. As a means for retaining the column of type in position while the filled holder is turning from a horizontal to a vertical position it is dovetailed or otherwise adapted to receive a slide 38, (shown in Figs. 2 and 3,) consisting, preferably, of a piece of sheet metal, which is withdrawn after the galley-holder has been turned to its vertical position. (Shown in Fig. 2.)

The construction and arrangement of our devices for separating the succeeding lines of type from the column contained in the galley and for pushing them into the feed-channel, along which they are carried to the point at which the individual type are separated, are best shown in Figs. 4 to 7, inclusive. The feed-channel 40 is a recess made in the framing 26, extending horizontally from the location of the galley, thence curving upwardly in an arc of ninety degrees, as shown in Fig. 2, so as to turn the type at right angles to the position occupied by it when in the galley. The line of type is pushed along this feed-channel by means of the line-pusher 41, which is fitted to slide in a guiding-way in the door 46, formed by the recess 42 and the gib 43. It is actuated in a forward direction by means of the spring 44, attached at one end to a convenient fixed portion of the frame and at the opposite end to a downwardly-projecting stud 45 of the pusher. An L-shaped portion 41$^a$ of the pusher extends into and substantially fills the feed-channel 40, the range of movement of the pusher being from its position shown in Fig. 6 to the rearward side of the type represented in that figure.

The bottom line of type 49 of the galley rests, as shown in Figs. 6 and 7, above a portion of the framing, which is recessed to the level of the feed-channel 40 and upon the forward end of the cut-off slide 50, and the succeeding lines are pushed from that position into alinement with the feed-channel by means of that slide, which has a movement in the frame of an extent seen by comparison of Figs. 4 and 6. As shown in Figs. 6 and 7, the slide is drawn backwardly to a considerable distance beyond the "feet" of the type in the galley, this being done in order to insure ample time for the type to drop to place when the slide is drawn back and before it again reaches the feet of the line of type in its forward movement. The cut-off slide is connected, by means of the link 51, lever 52, and eccentric-rod 53, with the eccentric 54, by means of which the slide is moved to the desired extent. The forward edge of that slide serves while stationary as a continuation of the rearward wall of the feed-channel, and the column of type is located rearwardly of the feed-channel, as shown in Fig. 5, far enough to enable rather more than half the length of the type to rest upon the slide, thereby preventing the downward tipping of the type and holding their forward ends safely above the line of type already in the channel, so as to leave that line free to be carried forward by the line-pusher.

When it is desired to bring a new line forward from the slide, the eccentric 54 is released, caused to make a single revolution, and is stopped again by means which form no part of the present invention. It is, however, necessary to show and describe the said means herein in order to explain the complete operation of the machine of the present invention, particularly that portion of the present invention which is adapted to automatically release the aforesaid eccentric at the desired times. The eccentric 54 is loosely mounted on the shaft 25 and is provided with a flanged portion 54$^a$, upon which is pivotally mounted the pawl 55, the longer end 55$^a$ of which is located in engaging relation to the continuously-rotating carrier 56, which is a disk fixed upon the shaft 26, having a shoulder 56$^a$ in its periphery for engaging with the hook 55$^a$ of the pawl, the latter being provided with a tension-spring 57, having its opposite end attached to the flange 54$^a$ of the eccentric. The pawl 55 is, however, during a greater portion of the time held out of engagement with the carrier 56 by means of the detent 58, which engages with another hook 55$^b$ of the pawl and holds the eccentric 54, and therefore the cut-off slide 50, in the position shown in Fig. 4 until the eccentric is again revolved. While in this position the pawl 55, under the tension of the spring 57, operates as a lever upon the detent 58 and upon the eccentric 54, tending to turn the latter backwardly upon its shaft, which movement, if permitted, would allow the hook of the detent to be struck by the shoulder of the carrier at each rotation of the latter. The backward turning of the eccentric is, however, prevented by the detent 64, which extends from the framing 26 and engages with a suitably-located notch on the flange 54$^a$ of the eccentric.

Having thus described the construction and arrangement of the means described and claimed in the aforesaid contemporaneously-pending application, a description will now be given of the devices of our present invention, which serve to automatically release the eccentric when the rearward end of the previously-separated line reaches a position in the feed-channel which permits the next line to be brought forward from the galley.

The detent 58 is pivotally mounted upon a stud 59, fixed in the frame 26, and is provided with an arm 60, which rests in the plane of movement of the lever 65. During the time that the line-pusher 41 is in operation the arm 60, with its associated line-cutting-off mechanism, is locked in the position shown in Fig. 4 by means of the locking-pawl 61, which is pivotally mounted upon the stud 62 and is pressed into locking relation to the arm 60 (shown in Fig. 4) by means of the spring 63. An upwardly-projecting portion 61$^a$ of the locking-pawl engages with the arm 60, while the body portion of the locking-pawl extends in the plane of the link 66, so as to be engaged by that link when the line-pusher reaches the position shown in Fig. 4, the continued movement of the pusher serving first to move the locking-pawl 61 far enough to release the arm 60 and then to move the latter arm far enough so that its detent releases the hook 55$^a$ of the eccentric-pawl and permits that eccentric to make one complete revolution, moving the slide to the position shown in Figs. 6 and 7 and back again to that shown in Fig. 4, the detent 58 again engaging with the hook 55$^b$ upon a completion of that revolution and detaching the hook 55$^a$ from the carrier. During this revolution of the eccentric 54 the line-pusher is moved back against the tension of its spring 44 to the position shown in Fig. 6 by means of the lever 65 and the link 66. The lever 65 is pivotally mounted upon the framework in the plane of the peripheral flange 54 of the eccentric, that periphery being provided with a recess 67, so located as to allow the lever and its attached line-pusher to move to the position shown in Fig. 4 when the eccentric is in its stationary position; but as soon as the eccentric is released, as above described, the bottom of the recess serves as a cam to move the engaging portion of the lever back upon the unrecessed portion of the periphery of the flange 54$^a$, thereby holding the pusher in its extreme rearward position to enable the next line to drop down and to be brought forward in line with the feed-channel, at which time the completion of the revolution of the eccentric 54, by means of which that line was thus moved, again brings the recess 67 into a position which permits of the renewed forward movement of the lever 65, and consequently of its attached line-pusher 41. During the time that the line-pusher is withdrawn from the rearward end of the advancing line for the purpose of adding a new line thereto the rearmost type, being left unsupported, are liable to become disarranged or to turn over on their sides under the action of the vibrations of the machine. To prevent this, we have provided means (best shown in Fig. 14) for holding those rearmost type in position, consisting of the presser-foot 70, which is preferably mounted in the lower end of the galley-holder 28 and is provided with a spring 71, by means of which it is urged downwardly with a suitable degree of pressure upon the type. The presser-foot is retained in place when the galley-holder is moved from its vertical position by means of a cross-pin 72 or in any other convenient way. The type being thus transferred to the feed-channel 40 are pushed horizontally along that channel and along its curved portion to and against the stop-finger 75. (Best shown in Figs 10 and 13.) That finger is attached to the framing and projects over the top of the feed-channel in coincidence with the reducing-nicks of the thicker type, the height of the stopping portion of the finger above the type-channel being somewhat less than twice the thickness of the thinnest piece of type. Therefore the line of separation between the uppermost piece of type resting against the stop-finger and the one below it is substantially coincident with the top of the type-channel, as shown in Fig. 13, or but slightly above the top, thereby permitting that uppermost piece and no more to be separated from the line. The single uppermost piece of type is pushed aside toward the left from the type-channel by means of the separator 76, which, as shown in the plan views, is bifurcated, so as to pass on the opposite sides of the stop-finger 75. The separator is fitted to slide in a hub 77 of the framework 26, and the desired amount of movement laterally of the type is imparted to the separator by its engagement in the cam-groove 78$^a$ of the cam 78. The extent of that movement is little more than is sufficient to move the type substantially its own width laterally from the channel in order to enable the next type to rise into its place. This lateral movement of the type brings it in front of the injecting-plunger 80, by means of which it is then pushed into one of the channels 11 of the distributing-cylinder 10 of the machine, that cylinder being intermittently rotated in the direction of the arrow adjacent thereto in Fig. 1 and indexed at its proper stopping positions by means which form no part of the present invention. The injecting-plunger 80 is located in line with one of the stopping positions of the type-channels and is supported for longitudinal movement upon an extension of the frame 26 of the machine. That longitudinal movement communicated by means of the lever 81, pivoted upon the upper end of the stud 59, is derived from the cam-groove 82$^a$ in the cam 78 by means of the slide 83, fitting in a projecting portion of the framing 26, the extent of movement being sufficient to carry the injecting-plunger from its position shown in Fig. 10 far enough to inject the type fully into the type-channel.

Inasmuch as the injecting-plunger engages with the face of the type it is preferably made of material which is not hard enough to injure the delicate lines of the type, or the front end of the plunger is faced with a comparatively soft material—such as celluloid, for example.

The type-channels in machines of this class are usually provided with followers which rest upon the type and by their gravity, aided sometimes by a spring, serve to hold and sometimes to carry the type to its lowest position in the channel, two of these followers 85 and 86 being shown in Figs. 1 and 2 in order to enable the operation of our device for lifting these weights during the injection of the type to be understood. This comprises a follower-lifter 87, which is pivotally mounted upon an upwardly-projecting extension of the frame 26 (best shown in Fig. 2) and engages with a cam 88, fixed upon the shaft 25, the lever being held into engagement with that cam by means of the spring 90. The cam 88 is so shaped and timed with relation to the movements of the cylinder and of the injecting-plunger as to raise the follower in time to allow the type to enter, the follower being allowed to drop upon the type again as soon as it is pushed fully to place. It is even desirable to let the follower rest upon the type just before the latter is fully injected, so as to prevent the possible rebound of the type and to retain it with its feet against the bottom of the channel, in which position alone is it presented in proper relation to the selecting-wards of the lower cylinder.

In order to control the rapidity of the upward movement of the line of type in the feed-channel, so as to prevent it from being forced with too violent a blow against the stop-finger after the separator 76 has drawn back to the position shown in Fig. 12, we preferably employ a guard-finger 92, which is fitted to slide vertically in suitable supporting-lugs in the framing 26, the end of the guard-finger being arched over, so as to project downwardly in line with the feed-channel. The central portion of the guard-finger is cut away, so as to clear the adjacent projecting portion of the stop-finger, or it may be bifurcated, so as to come into contact with the type upon the two sides of that guard-finger. A vertical reciprocating movement is imparted to the guard-finger of an extent sufficient to permit of the separation of the widest pieces of type to be employed, the extent of movement shown in the drawings being sufficient to allow of the separation of two-em spaces. This movement is communicated by means of the lever 93, which is pivotally mounted upon the framing and engages with the groove 94$^a$ in the periphery of the cam 78, fixed upon the shaft 25.

It is found desirable to provide means for preventing the separated pieces of type from turning over while they are being pushed laterally from the type-channel in front of the injecting-plunger 80. Our preferred means for this purpose comprises a buffer 95, which is so mounted in the frame 26, opposite to the end of the feed-channel, as to permit of a lateral movement substantially equal to that of the separator, the buffer being pressed by means of the spring 96 to the position shown in Fig. 10, thereby engaging the type on the side opposite the separator, thus imposing a yielding resistance to the lateral movement of the type and serving to hold it tightly against the separator, the type being pushed from between the separator and the buffer by means of the injector-plunger, as above described, or a flat spring may be attached in the place of the spring 96 and bear directly against the type, thereby dispensing with the buffer 95. We, however, prefer to employ that buffer.

In order to provide for moving the buffer from the position shown in Fig. 10 and out of the way of the injector-plunger when the machine is running without type, or in case a piece of type for any reason fails to rise to its separating position, the buffer is provided with the pin 97, located in line with the projection 98 of the separator 76, which upon the forward movement of that separator serves to push the buffer out of the way in case the type fails to do so, thereby permitting the forward movement of the plunger. This safeguard is of service at least once for each line, even in the normal operation of the machine, during the stroke or "pick" which serves to bring a new line forward from the galley. The line-pusher being at that time drawn back to admit the new line allows the line in the feed-channel to stand still.

In Fig. 16 is shown a modified construction of our separator, whereby we are enabled to dispense with the buffer altogether. In that modification the separator 99 is arched over the type, so as to engage both sides of it, thereby effectually preventing the tipping of the type. In the use of this modification, however, it would be necessary to also modify the form of the cam for driving the separator, delaying its return movement until the injecting-plunger 80 has been fully drawn back, unless the arched portion of the separator is made high enough and sufficiently elastic to allow its type-engaging ends to spring apart to the extent of its stroke, in which case the separator may be drawn back as before.

In order to inclose the feed-channel by means affording ready access thereto, we preferably provide a door, hinged at 47 to the frame and held in its closed position by means of the spring-catch 48, which may readily be depressed by the thumb of the operator when it is desired to open the door and expose to view the entire line of type in the feed-channel and to facilitate the removal of broken or irregular type. As previously described, the line-pusher 41 is mounted upon this cover or door, the link 66, by means of which the pusher is connected with its lever 65, permitting the door to swing open to the desired extent.

A description will now be given of the operation of the machine, it being assumed that a galley of type has been placed in position in the holder while the latter is in its inclined or horizontal position with the lower line resting against the stop 38. The galley is then turned to its vertical position, and the stop 38 is withdrawn, thereby permitting the bottom line 49 of the type to rest in the position shown in Fig. 5 upon the top of the cut-off slide 50. The line-pusher 41, irrespective of the presence or absence of type in the feed-channel, will upon arrival at its forward position (shown in Fig. 4) engage with and unlock the locking-pawl 61 and disengage the detent 58 from the pawl 55, thereby permitting the latter to engage with the carrier 56 and causing the eccentric 54 to make one complete revolution, at the completion of which its movement is again arrested by the detent. This revolution of the eccentric first moves the cut-off slide 50 to the position shown in Figs. 6 and 7, permitting the line 49 to drop to the plane of the type-channel, as shown in the latter figure, and upon the forward movement of the slide 50 that line of type is pushed thereby into alinement with the feed-channel, along which it is then advanced by the pusher. Upon starting the machine in operation with the feed-channel empty it is preferable to operate it by hand for a few revolutions, or until the type in the feed-channel extend to the stop-finger 75, after which the motive power of the machine may be applied by means of any convenient clutch or shipper mechanism, when the devices repeat their respective functions automatically.

The operations of successively separating the individual type from the line and injecting them into their respective channels in the cylinder 10 may be seen in three different phases in Figs. 8 to 13, inclusive. The function of the stop-finger and of the guard-finger at these three phases may best be understood from the end views of Figs. 12 and 13, while the function, mode, and time of operation of the separator, the buffer, and the injecting-plunger at these three phases may best be seen by a comparison of the plan views of Figs. 8, 9, and 10. In Fig. 8 the type, having been pushed laterally from over the feed-channel by means of the separator 76, is being pushed from between the separator and the buffer 95 toward the channel 11, which in the intermissions of its rotation is accurately indexed in this position, the follower having also been lifted by the lifter 87, as shown in Fig. 2. In Fig. 9 the type is shown as being pushed half-way into the cylinder. In Fig. 10 the injecting-plunger is shown fully retracted, the buffer 95 is pushed forward by its spring to receive the succeeding type, and the channel containing the last-injected piece of type $t$ has been indexed to its next position, bringing the succeeding channel into alinement to receive the succeeding piece of type. As soon as the type $t$ has been pushed aside, the guard-finger 92 descends, so as to rest against the upper face of the succeeding piece of type, as shown most clearly in Fig. 12, from which position it gradually rises to that shown in Fig. 13, thereby considerably lessening the force of the blow with which the type would otherwise be liable to strike against the stop-finger 75. During this upward movement of the type the guard-finger serves also to hold the type in a horizontal position and prevents any tendency to tip which might be due to the presence of broken pieces of type, dirt, or other foreign matter in the line, so that the lower surface of the type when in the position shown in Fig. 13 shall be in a plane substantially parallel with that of the upper surface of the feed-channel. On account of the lightness, simplicity, and short range of movement of each of these parts the operation of separating the individual type may be repeated with great rapidity, the line being constantly pushed forward through the feed-channel under the influence of the line-pusher spring 44. As the pusher 41 reaches the position shown in Fig. 4, the lever 65 and the link 66 unlock and release the eccentric 54, enabling that eccentric to make one revolution, carrying the pusher back and cutting off and moving into alinement with the feed-channel the succeeding line from the galley in the manner already fully described.

It will be noted that at each revolution of the eccentric 54 for the purpose of cutting off and bringing forward a new line the operation of separating the individual type at the opposite end of the feed-channel is interrupted, thereby missing a single "pick" for each new line thus cut off and brought forward from the galley. This interruption is due to the fact that the pressure of the spring 44 is removed from the rearward end of the line of type in the feed-channel when the pusher 41 is moved back to the position shown in Fig. 6 by the cam and the flange $54^a$ to permit the new line to be brought forward; but upon completion of the rotation of the eccentric 54 the recess 67 in the flange $54^a$ coming again into coincidence with the lever 65 allows the pusher-spring 44 to resume its momentarily-interrupted pressure against the rearward end of the line, which now includes the new line brought forward from the galley.

The cut-off slide 50 shown herein is preferably made slightly thicker than the type, and its forward edge must, therefore, be slightly beveled to enable it to enter safely beneath the succeeding line in the galley on its forward movement. Instead of this, however, the bottom of the feed-channel may be slightly lower than the seat of the cut-off slide, so that the line of type when pushed clear forward would drop away from the succeeding line in the galley, in which case the thickness of the cut-off slide may be equal to or even less than that of the lines. Although this cut-off member is herein termed a "slide," it is evident that it may be otherwise supported for reciprocatory movement, which may also be oscillatory or other than rectilinear, as may best suit its environment or suit the preferred method of applying its driving movement, it being obvious that the method of application of that driving movement herein shown is but one of many ways well known to those skilled in this art.

In Fig. 17 is shown a modified construction and arrangement of the means for holding the galley-receiver in its two desired positions. In that modification the stud 29, on which the galley-receiver 28 is pivotally supported, is provided with a single spline $30^a$, the splineway $32^a$ of the galley-receiver being made wide enough to permit of the desired oscillatory movement of the galley-receiver from its vertical to its inclined or horizontal positions. In Fig. 17 the receiver is represented as being in its vertical position, in which its weight, preponderating on the left-hand side of the stud, is supported by the right-hand shoulder of its splineway bearing against the spline $30^a$. When turned to its backwardly-inclined or horizontal position, the preponderance of weight is carried to the other side of the stud, and is therefore supported by the opposite or left-hand shoulder of the splineway. In some machines or for some purposes it may not be desirable or possible to turn the galley-receiver back to a horizontal position, as shown in Fig. 3, and it may be held at any desired angle of backward inclination by suitably locating the splines of Fig. 1 or in the modification shown in Fig. 17 by making the splineway 32ª of a suitable width.

In place of the galley-receiver herein shown we may employ special galleys provided with a lug or boss corresponding to that of the galley-receiver and fitting directly on the stud 29. We prefer, however, to use such a receiver as is herein shown adapted to receive the ordinary galleys employed in printing establishments.

The line-pusher for the feed-channel may be actuated by a weight or by a spring or by a combination of both, as may be required, it being only essential that the means employed shall be of a yielding nature, on account of the occasional interruptions to the line-pushing movement at the intervals of bringing forward a new line.

In employing this device in connection with a machine which allows of placing the feed-channel vertically and of feeding the type downwardly the line-pusher may conceivably be omitted altogether, especially if the feed-channel is made long enough to contain a considerable amount of type having sufficient weight to feed by its own gravity. In such a case also the feed-channel need not be curved, the object of thus curving it in the present embodiment of our invention being to effect the turning of the type from the position originally occupied by it in the horizontal lines of the galley to its final position in the vertical type-channel. Hence the terms "upward," "downward," "backward," "forward," &c., employed herein are to be applied in their relative and not their absolute sense, since it is obvious that the device, either in part or in its entirety, might be turned upon its side, inverted or transposed as to position, direction, or sequence of operation, and many other modifications may also be made in the various elements, or equivalent elements may be substituted therefor, without departing from the general scope and intent of the invention.

We claim as our invention—

1. A galley-receiver, having a transverse bearing provided with a splineway, and a pivotally-supporting stud therefor, provided with a plurality of splines fitting the splineway, and located so as to sustain the receiver at the desired angular position upon its transverse bearing.

2. A galley-receiver, having a transverse bearing provided with a splineway, and a pivotally-supporting stud therefor having two splines located on the opposite sides of the receiver, and at an angular distance apart corresponding to that of the desired positions of the galley, substantially as described.

3. In combination with means for cutting off the succeeding lines from a column of type, an intermittently-operating driving device therefor, a detent for holding the driving device out of operation, a locker for the detent, and means operable with, and controlled by, the previously-cut-off line for disengaging first the locker, and then the detent when the said line reaches a predetermined position.

4. In a machine of the class specified, in combination with the line-pusher thereof, an intermittently-operating driving device for returning the pusher to its backward position, a detent for holding the driving means stationary during the desired intermissions in its operation, and a locker for the detent, portions of the detent and of the locker being located in the path of movement of the line-pushing device, whereby they are disengaged by the latter upon its arrival at the predetermined limit in its forward movement.

5. In combination with means for positively separating type of varying thicknesses, of which those having a thickness equal to or greater than twice that of the thinnest type are reduced at some portion thereof to a thickness slightly less than twice that of the thinnest type, a feed-channel for the line of type, and a stop-finger located in the plane of the reduced portion of the type, and at a distance from the end of the channel slightly less than twice the thickness of the thinnest type.

6. Means for positively separating type of varying thicknesses, of which those having a thickness equal to or greater than twice that of the thinnest type are reduced at some portion thereof to a thickness slightly less than twice that of the thinnest type, consisting of a feed-channel for the line of type, and a stop-finger located in the plane of the reduced portion of the type, at a distance from the end of the channel slightly less than twice the thickness of the thinnest type, and a positively-operated separator for moving each successive leading piece of type laterally aside from the line.

7. Means for positively separating type of varying thicknesses, of which those having a thickness equal to or greater than twice that of the thinnest type are reduced at a portion thereof substantially central of their length to a thickness slightly less than twice that of the thinnest type, consisting of a feed-channel for the line of type, a stop-finger extending into the plane of the channel in line with the reduced portions of the type, and a bifurcated separator extending on both sides of the stop-finger and engaging with each foremost piece of type to move it laterally across the end of the channel, with means for positively reciprocating the separator.

8. The combination of a feed-channel for type, means for advancing the type along the channel, a stop-finger extending into the line of the channel, and a guard-finger for engaging with the foremost type, with means for controlling the movement of the guard-finger, whereby it cushions the force of impact of the type against the stop-finger.

9. In combination with means for supporting a line of type and for positively separating the foremost piece thereof, a resilient buffer having its type-engaging face parallel with that of the type-separating means, and coöperating therewith to prevent the tilting of the type.

10. A type-separator for engaging with one side of a piece of type, and a resiliently-mounted buffer for yieldingly engaging with the opposite side of the type, for the purpose specified.

11. The combination of a separator, a yielding buffer normally coöperating therewith through the medium of the type, and means independent of the type and intermediate the separator and the buffer for carrying the latter aside in advance of the separator to an extent equal to the width of the type, even when the latter is absent.

12. The combination of a separator, a yielding buffer normally coöperating therewith through the medium of the type, and means intermediate the separator and the buffer for carrying the latter aside with the separator when no type is contained between them.

13. In combination with a series of intermittently and laterally moving type-channels, an injector mounted in coincidence with a stopping position of the channels, with means for moving the injector toward its coincident channel at each intermission of the channel movement.

14. The combination of an intermittently-rotating cylinder, provided with peripheral type-channels, an injector mounted and operating in line with the stopping position of the channels and in a plane substantially at right angles to the axis of the cylinder, with means for operating the injector at each intermission in the rotation of the cylinder.

15. In a machine of the class specified, in combination with the intermittently-rotating cylinder thereof, provided with peripheral channels, an injector mounted and operating in line with one of the stopping positions of the channels, and in a plane substantially at right angles to the axis of the cylinder, means for supporting and guiding a line of type, and a separator for separating the successive pieces of type and delivering them to and in front of the injector.

16. In a machine of the class specified, in combination with the intermittently-rotating distributing-cylinder thereof, an injector mounted in line with one of the stopping positions of the type-channels, means, as a feed-channel, for supporting and guiding a line of type, a stop-finger for stopping the foremost type, and a separator for moving that type from the line into the path of movement of the injector.

17. In a machine of the class specified, in combination with the intermittently-rotating distributing-cylinder thereof, an injector mounted in line with one of the stopping positions of the type-channels, means, as a feed-channel, for supporting and guiding a line of type, a stop-finger for stopping the foremost type, a separator for moving that type from the line into the path of movement of the injector, with means for actuating the separator and the injector in proper time and relation to the intermissions in the rotation of the cylinder.

18. In combination with a type-containing channel and a follower therefor, a lifter for raising the follower, and means for operating the lifter.

19. In combination with a series of intermittently and laterally moving type-channels, provided with followers, a lifter therefor, consisting of a lever having its follower-engaging end located at one of the stopping positions of the followers, with means, as a cam, for operating the lever.

20. In a machine of the class specified, in combination with the intermittently-rotating type-channels thereof, provided with followers, a lifter therefor, located with its follower-engaging end at one of the stopping positions of the followers, and means, as a cam, actuating the lifter to raise each succeeding follower while at its stopping position.

21. In combination with a series of transversely and intermittently moving type-containing channels, provided with followers, an injector, located in the plane of one of the stopping positions of the type-channels, and a lifter located in the same plane, so as to engage with the follower of each successive channel while it is in line with the injector and during the intermission in the transverse movement.

22. In a machine of the class specified, in combination with the intermittently-rotating distributing-cylinder thereof, having a series of peripheral type-channels provided with followers, an injector for the type, and a lifter for the followers located at one of the stopping positions of the channels, means as a feed-channel for supporting and guiding a line of type, and separating devices for separating the succeeding pieces of type from the line and feeding them singly into the path of movement of the injector, substantially as described.

EMIL F. LINKE.
GUY L. WILLEY.

Witnesses:
JENNIE NELLIS,
W. H. HONISS.